United States Patent
Meinherz

(10) Patent No.: US 6,686,553 B1
(45) Date of Patent: Feb. 3, 2004

(54) THREE-PHASE ENCAPSULATED HIGH-VOLTAGE CIRCUIT BREAKER FOR OUTDOOR USE

(75) Inventor: Manfred Meinherz, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/795,705

(22) Filed: Mar. 1, 2001

(30) Foreign Application Priority Data

Mar. 17, 2000 (DE) .......................... 100 14 680

(51) Int. Cl.$^7$ ............................... H01H 33/28
(52) U.S. Cl. .................... 218/152; 218/120; 218/140; 218/154; 218/153
(58) Field of Search ................. 218/118, 120, 218/137–139, 140, 152, 154–155, 156, 153

(56) References Cited

U.S. PATENT DOCUMENTS

| | | | | |
|---|---|---|---|---|
| 3,571,773 A | * | 3/1971 | Johnston et al. ............ | 218/118 |
| 3,745,284 A | * | 7/1973 | Hosokawa ................... | 218/120 |
| 4,440,998 A | * | 4/1984 | McConnell et al. ......... | 218/118 |
| 4,570,202 A | * | 2/1986 | Nishida et al. .............. | 361/333 |
| 4,810,840 A | * | 3/1989 | Okuno ........................ | 218/118 |
| 5,025,118 A | * | 6/1991 | Meinherz et al. ........... | 218/118 |
| 5,128,502 A | * | 7/1992 | Hux ............................ | 218/155 |

FOREIGN PATENT DOCUMENTS

| | | |
|---|---|---|
| DE | 197 20 093 A1 | 5/1997 |
| DE | 298 06 652 U1 | 4/1998 |
| EP | 0 744 758 A2 | 11/1996 |

* cited by examiner

*Primary Examiner*—Lincoln Donovan
(74) *Attorney, Agent, or Firm*—Morrison & Foerster LLP

(57) ABSTRACT

A three-phase encapsulated high-voltage circuit breaker for outdoor use, whose interrupter units are arranged in a tubular switch housing which is arranged horizontally. Phase connections of the interrupter units are passed vertically and together through in each case one connecting flange, with each connecting flange having an associated splitting module which is fitted with outdoor bushings. Each phase connection has an associated current transformer, and these items are located within the housing and are attached to the respective splitting module.

2 Claims, 1 Drawing Sheet

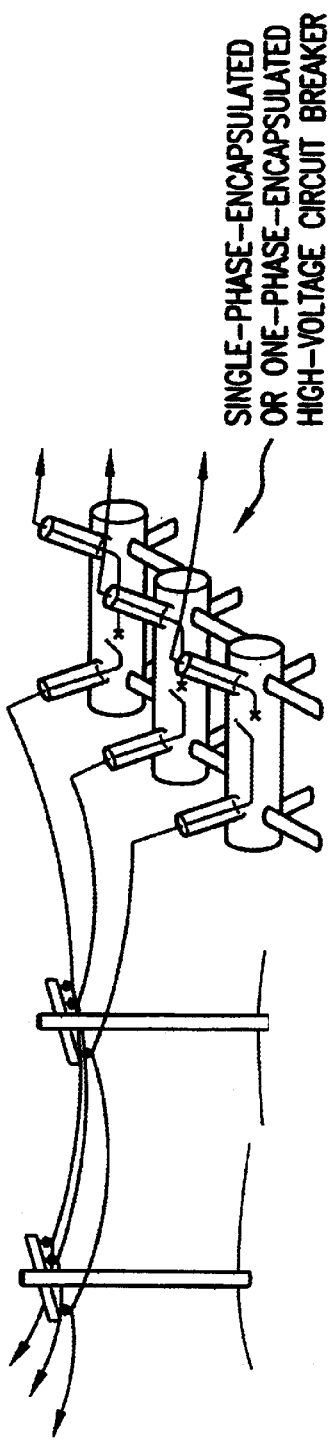
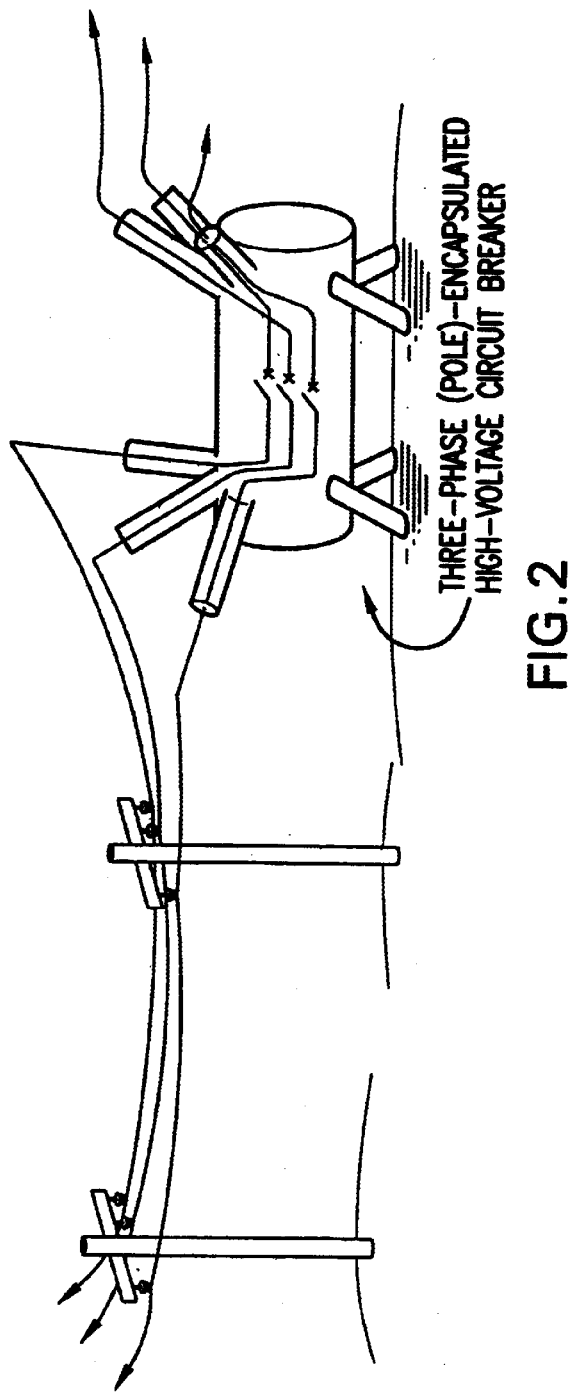
FIG. 1 — SINGLE-PHASE-ENCAPSULATED OR ONE-PHASE-ENCAPSULATED HIGH-VOLTAGE CIRCUIT BREAKER
FIG. 2 — THREE-PHASE (POLE)-ENCAPSULATED HIGH-VOLTAGE CIRCUIT BREAKER

THREE-PHASE ENCAPSULATED HIGH-VOLTAGE CIRCUIT BREAKER FOR OUTDOOR USE

Three-phase encapsulated high-voltage circuit breaker for outdoor use

This application claims priority to German Patent Application No. 100 14 680.5 which was filed on Mar. 17, 2000.

TECHNICAL FIELD OF THE INVENTION

The invention relates to a three-phase encapsulated high-voltage circuit breaker for outdoor use, and in particular, to a three-phase encapsulated high-voltage circuit breaker whose interrupter units are arranged in a tubular switch housing.

BACKGROUND OF THE INVENTION

In a conventional high-voltage circuit breaker, a splitting module is indirectly associated with a connecting flange at a switch output such that a housing, which accommodates a switch disconnector, is provided between the splitting module and the connecting flange of the switch housing, see, for example, DE 197 20 093 A1. In this high-voltage circuit breaker, a current transformer is located within the switch housing and is associated with the phase connections of the switch output.

Another three-phase encapsulated high-voltage circuit breaker for outdoor use is described in EP 0 744 758 A2. Both the phase connections of the switch input and the phase connections of the switch output each have an associated current transformer. In this case, the current transformers are arranged outside the tubular stubs which the phase connections are passed out, by concentrically surrounding the tubular stubs. This arrangement of the current transformers requires a relatively long distance between the splitting modules which support the outdoor bushings, and thus also a relatively large switch housing which occupies a corresponding amount of space of installation.

SUMMARY OF THE INVENTION

In one embodiment of the invention, a three-phase encapsulated high-voltage breaker for outdoor use, whose interrupter units are arranged in a tubular switch housing which is arranged horizontally, out of which the phase connections of the interrupter units are passed vertically and together through in each case one connecting flange, with each connecting flange having an associated splitting module which is fitted with outdoor bushings, and each phase connection having an associated current transformer, wherein the current transformers are located within the switch housing and, for this purpose, are attached to the respective splitting module.

In one aspect of the invention, the three-phase encapsulated high-voltage circuit breaker, wherein each splitting module is in the form of a coupling, with the connecting flanges for the outdoor bushings being arranged inclined with respect to a vertical plane running transversely with respect to the switch housing.

BRIEF DESCRIPTION OF THE DRAWINGS

An exemplary embodiment of the invention is illustrated in the figure.

FIG. 1 shows a three-phase encapsulated high-voltage circuit breaker for outdoor use with a switch housing which is illustrates substantially cut away.

FIG. 2 shows a three-phase (pole)-encapsulated high-voltage circuit breaker.

DETAILED DESCRIPTION OF THE INVENTION

A three-phase encapsulated high-voltage circuit breaker having current transformers which are associated both with phase connections of the switch input and with phase connections of the switch output, and is distinguished by the switch housing being physically small and thus also occupying a relatively small area when installed in a high-voltage switch gear assembly.

According to the invention, the current transformers are located within the switch housing, and are attached to the respective splitting module.

The current transformers can be attached to the splitting modules in various ways, for example in the manner provided in accordance with the utility model document DE 29 806 652 U1. Alternatively, the current transformers can be attached via a holder to the wall of the respective splitting module. In this case, the holder may comprise, for example, a supporting framework or supporting rods. In this case, both the supporting framework and the supporting rods should advantageously be composed of an insulating material.

In another embodiment of the invention, each splitting module is in the form of a coupling, with the connecting flanges for the outdoor bushings being arranged inclined with respect to the switch housing. This allows a mutual association between the base regions of the outdoor bushings in a very small area.

The interrupter units 2 of the high-voltage circuit breaker 3 are arranged in the tubular switch housing 1, which is arranged horizontally. In the illustrated embodiment, interrupter units 2 are arranged alongside one another, parallel, in a plane, but can also be arranged in a triangle. The tubular switch housing 1 is arranged on a supporting framework 4 which at the same time supports the switch drive 5, which is arranged at the end of the tubular switch housing 1.

The tubular switch housing 1 has two stubs 8, 9 which are each provided with a connecting flange 6, 7, with each connecting flange 6, 7 having an associated splitting module 12, 13 which is fitted with outdoor bushings 10, 11. These are designed in the form of hemispherical couplings and are provided with connecting flanges 14, 15 for the outdoor bushings 10, 11, which are arranged inclined with respect to a vertical plane 16 running transversely with respect to the tubular switch housing 1.

The high-voltage circuit breaker 3 is provided with two current transformer groups 17, 18. The arrangement of two current transformer groups 17, 18—within each case one current transformer for each phase conductor—is associated with the advantage that faults in the interrupter units 2 can be identified in good time from differences resulting from the current measurement at the switch input 19 and at the switch output 20. In order now not to increase the distance between the splitting modules 12, 13 and the outdoor bushings 10, 11 fitted with them, despite the arrangement of two current transformer groups 17, 18, one of which is associated with the phase connections 21 and the other of which is associated with the phase connections 22 of the interrupter units 2, both current transformer groups 17, 18 are arranged within the tubular switch housing 1. In this case, the phase connections 21, 22 of the interrupter units 2 are arranged running vertically in the region of the current transformer groups 17, 18 and, originating from the inclined arrangement of the connecting flanges 14, 15 for the outdoor bushings 10, 11 are bent within the splitting modules 12, 13 such that, outside the switch housing, they run in the axial direction of the outdoor bushings 10, 11.

Although this is not described in any more detail, the current transformer groups 17, 18 are attached to the respective splitting module 12, 13. The attachment of the current transformer groups 17, 18 to the splitting modules 12, 13 can, essentially, be carried out in an analogous manner to the attachment as is provided in principle for attachment of a current transformer group to an encapsulation module in a circuit breaker according to the utility model document DE 298 06 652 U1.

What is claimed is:

1. A three-phase encapsulated high-voltage circuit breaker comprising:

interrupter units arranged in a tubular switch housing which are arranged horizontally;

a plurality of splitting modules, each splitting module having a connecting flange, the splitting modules being fitted with outdoor bushings; and a plurality of phase connections led into respective splitting modules through a respective connecting flange, each phase connection having a separate current transformer, wherein the current transformers are provided for the respective phase connections such that a current in the respective interrupter unit can be detected, wherein each of the current transformers are located within the switch housing and are attached to a respective splitting module.

2. The three-phase encapsulated high-voltage circuit breaker as claimed in claim 1, wherein each splitting module is in the form of a coupling, with the connecting flanges for the outdoor bushings arranged to be inclined with respect to a vertical plane running transversely with respect to the switch housing.

* * * * *